(12) United States Patent
Yano

(10) Patent No.: US 12,047,668 B2
(45) Date of Patent: Jul. 23, 2024

(54) IMAGING ASSEMBLY, AND ACQUISITION CIRCUIT MOUNTED ON A MOVING BODY

(71) Applicant: CANON KABUSHIKI KAISHA, Tokyo (JP)

(72) Inventor: Hiroshi Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 17/725,165

(22) Filed: Apr. 20, 2022

(65) Prior Publication Data

US 2022/0345618 A1     Oct. 27, 2022

(30) Foreign Application Priority Data

Apr. 26, 2021   (JP) .................................. 2021-074345

(51) Int. Cl.
*H04N 23/62*    (2023.01)
*B60R 1/26*     (2022.01)

(52) U.S. Cl.
CPC .............. *H04N 23/62* (2023.01); *B60R 1/26* (2022.01); *B60R 2300/20* (2013.01)

(58) Field of Classification Search
CPC ........ H04N 23/62; B60R 1/26; B60R 2300/20
See application file for complete search history.

(56) References Cited

U.S. PATENT DOCUMENTS

| 8,201,199 B2 | 6/2012 | Okamoto et al. |
| 2009/0174775 A1* | 7/2009 | Okamoto ................ G06T 15/20 348/148 |

FOREIGN PATENT DOCUMENTS

JP      2002-374523 A    12/2002

* cited by examiner

*Primary Examiner* — Twyler L Haskins
*Assistant Examiner* — Fayez A Bhuiyan
(74) *Attorney, Agent, or Firm* — Canon U.S.A., Inc., IP Division

(57) ABSTRACT

An imaging assembly includes an image acquisition circuit provided in a rear portion of a moving body. The image acquisition circuit includes an optical circuit and an image capturing circuit. The optical circuit forms an image in a first region and an image in a second region on the peripheral side having a lower image capturing magnification than the first region. A light receiving surface of the image capturing circuit includes a region in which light is incident along the optical axis of the optical circuit through the first region, and a region in which light is incident through the second region. The image acquisition circuit is disposed so that the optical axis of the optical circuit passes through an opening provided in the moving body, and light from the rear end of the moving body is incident on the image capturing surface.

17 Claims, 19 Drawing Sheets

IMAGING ASSEMBLY, AND ACQUISITION CIRCUIT MOUNTED ON A MOVING BODY

BACKGROUND

Technical Field

One disclosed aspect of the embodiments relates to a moving body on which an image capturing system is mounted, and an image capturing system mounted on a moving body.

A moving body mounted with an image acquisition circuit is, for example, a vehicle traveling on public roads, such as an automobile. As an image acquisition circuit mounted on a vehicle, a camera configured to capture images of the area ahead of a vehicle and a camera configured to capture images of the area behind a vehicle are used. In particular, a camera attached to be rearward facing on a rear portion of a vehicle is used mainly for rearward monitoring during traveling. An electronic room mirror or inner mirror (hereinafter referred to as "electronic room mirror") having a function as an alternative to a conventional optical room mirror has a function of displaying a captured image of the area behind the vehicle (rearward image). For example, during reversing of a vehicle, an image captured by a rear monitoring camera is displayed on the electronic room mirror.

Japanese Patent Application Laid-Open No. 2002-374523 discloses a monitoring system for presenting a rearward image that does not give a sense of incongruity to a user even when a camera configured to capture a rearward image is installed so as to be displaced from the center of the rear of a vehicle. A rear monitoring camera is installed at the rear portion of a vehicle so as to be displaced from the center line in the longitudinal direction of the vehicle. When a rearward image of the vehicle is generated from a captured image, image processing is performed so that the vertical center in the rearward image substantially corresponds with the center line in the longitudinal direction of the vehicle.

In addition, a camera that is installed at the rear portion of a vehicle, in particular, a rear monitoring camera during reversing of the vehicle, is generally mounted below the center of the vehicle.

Although in the conventional technology disclosed in Japanese Patent Application Laid-Open No. 2002-374523 there is a utility in a rearward image as if viewed from the center of a vehicle that can be displayed while reversing of the vehicle, in order to generate the rearward image, performing of extensive image processing is required. Therefore, there is a concern that a time lag associated with the time required for the image processing is generated and that a large-scale processing unit is required for image processing. In addition, the rear monitoring camera is mounted below the center of the rear portion of the vehicle and performs wide-angle image capturing. If the quality of the detailed portions in a captured image is low, there is a possibility that the function of the electronic room mirror that displays the rearward image will be degraded.

SUMMARY

An imaging assembly is mounted on a moving body with respect to an opening portion. The imaging assembly includes an optical circuit and an image capturing circuit. The optical circuit is configured to form an image of a subject in a first region and an image of a subject in a second region in which image forming magnification is relatively lower than that of the first region. The image capturing circuit is configured to generate image data based on an image of the subject formed on a light receiving surface by the optical circuit. The imaging assembly is capable of capturing an image of a portion of the moving body and the outside portion of the moving body through the opening portion.

Further features of the disclosure will become apparent from the following description of exemplary embodiments (with reference to the attached drawings).

DESCRIPTION OF THE EMBODIMENTS

Hereinafter, with reference to the attached drawings, the disclosure is explained in detail in accordance with preferred embodiments. The disclosure can be applied to a moving body (moving apparatus such as a vehicle, a ship, and the like) provided with an opening portion at an end portion. In an embodiment, an example of an imaging assembly in which one image acquisition circuit is disposed in vicinity of an opening portion in the rear portion of a vehicle is shown. An image acquisition circuit is disposed at a position where the optical axis of the optical circuit passes through the opening at the end portion in a direction opposite to the traveling direction of the vehicle, and can acquire a rearward image including an image of a portion of the vehicle. In the following, the term "unit" may be used to refer to a circuit, a subsystem, a module, a functional block, a logic device, a physical device, a processor, or hardware elements. It may include mechanical, optical, or electrical components, or any combination of them. It may include active (e.g., transistors) or passive (e.g., capacitors) components. It may include one or more programmable processors, such as a central processing unit (CPU) or a microprocessor, that are configured to execute instructions or programs stored in one or more memory devices to perform specified operations. It may include logic elements such as AND-OR, and NOT elements implemented by transistor circuits or any other switching circuits. Typical combinational logic functions may be implemented by switching circuits such as multiplexers (to implement select functions), encoders, and decoders.

First Embodiment

Figure 1:
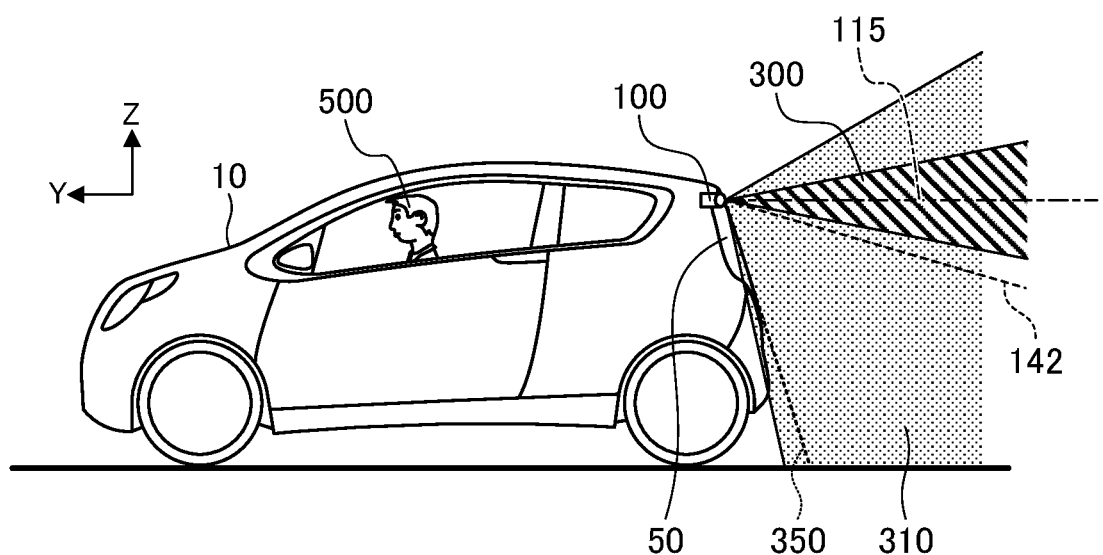
FIG. 1 is a side view showing a moving body and an imaging assembly according to a first embodiment.
Figure 2:
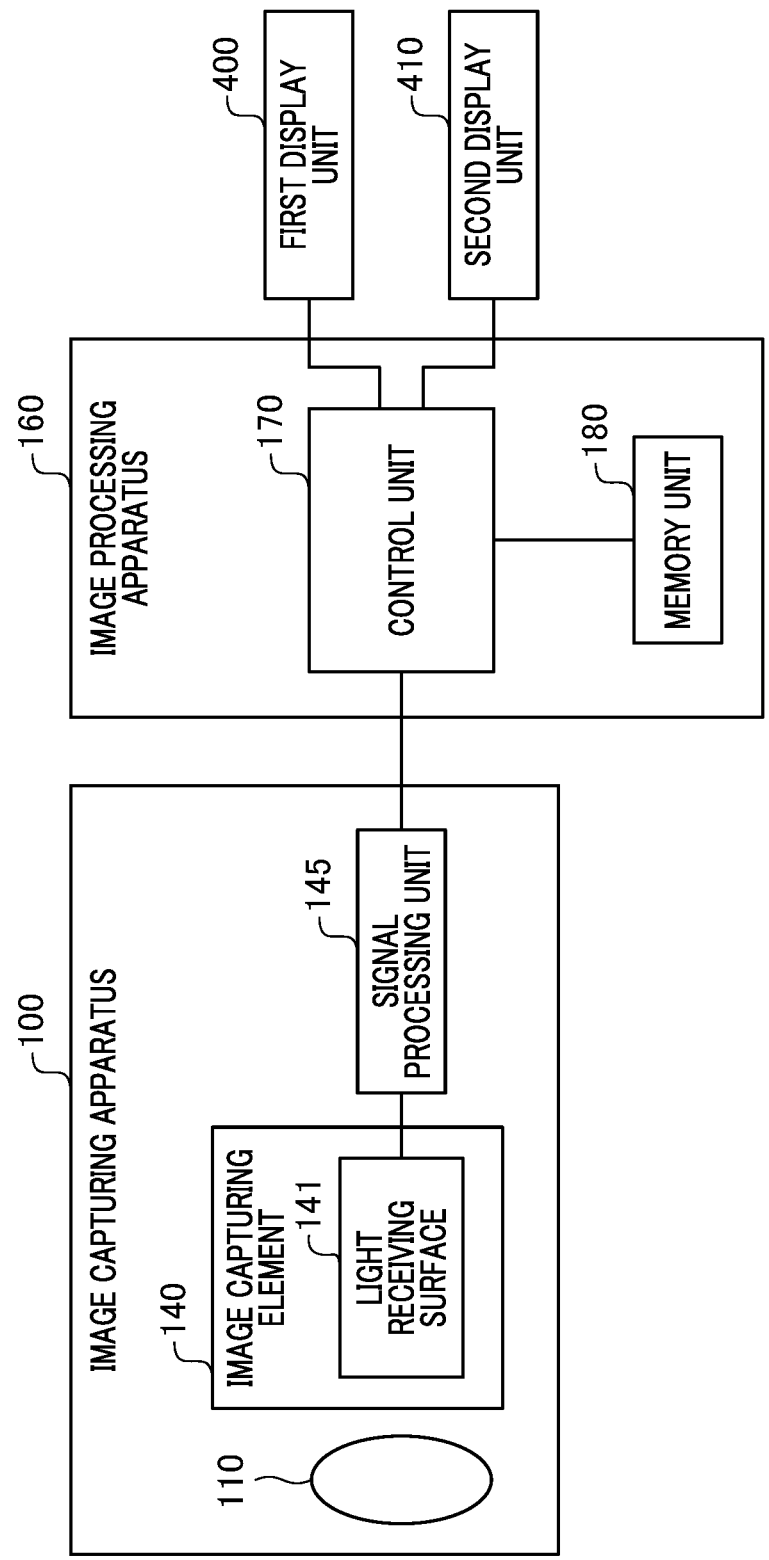
FIG. 2 is a system configuration diagram of an imaging assembly according to the first embodiment.

FIG. 1 is a side view of a moving body and an imaging assembly according to the present embodiment. FIG. 2 is a system configuration diagram of an imaging assembly according to the present embodiment. An image acquisition circuit 100 is mounted on a moving body 10. In the present embodiment, a moving body 10 is a vehicle traveling on a public road such as an automobile with a driver 500 on board, and is movable to an arbitrary location. A front-rear direction along a traveling direction of the moving body 10 is defined as a Y-axis direction, and a vertical direction perpendicular to the ground surface is defined as a Z-axis direction. The front side with respect to the Y-axis direction is defined as the +Y side, and the rear side defined as the −Y side. In addition, the upper side with respect to the Z-axis direction is defined as the +Z side, and the lower side defined as the −Z side.

The image acquisition circuit 100 includes an optical circuit 110 configured to form an optical subject image from external light. The optical circuit 110 can form an image in a first and a second region centered on an optical axis 115. The first region is a high resolution region having a relatively high optical image formation magnification, and the second region is a peripheral resolution region having a low optical image formation magnification as compared with the high resolution region. The high resolution region and peripheral resolution region will be described below with reference to FIGS. 3A, 3B, and 3C.

The image acquisition circuit 100 is provided with an image capturing element or circuit 140 and a signal processing unit or circuit 145. The image capturing circuit 140 photoelectrically converts the light taken in by the optical circuit 110 into an electrical signal. The external light incident on the optical circuit 110 reaches a light receiving surface of the image capturing circuit (hereinafter, referred to as a "light receiving surface") 141, and is converted into an electrical signal. The signal processing unit 145 performs processing for converting an electrical signal from the image capturing circuit 140 into a predetermined image signal. The signal processing unit 145 transmits the converted image signal to an image processing apparatus 160. In addition to the present embodiment, there is also a configuration in which the image processing apparatus 160 includes a signal processing unit 145 therein. Further, the image acquisition circuit 100 and the image processing apparatus 160 may be integrated with each other.

The image processing apparatus or circuit 160 is provided with a control unit or circuit 170 and a memory unit or circuit 180. The control unit 170 includes a CPU (Central Processing Unit) and performs control of image processing, various signal control, selection of an output destination, and the like. A plurality of display devices or displays configured to display images having different angles of view are connected to the image processing apparatus 160. For example, the control unit 170 performs image display control of a first display 400 and a second display 410. In addition, a memory unit 180 temporarily stores or holds image data and the like.

In FIG. 1, the image capturing range 300 of the high resolution region and an image capturing range 310 of the peripheral resolution region related to the image acquisition circuit 100 are shown separately. The image capturing range 300 of the high resolution region is an image capturing range centered on the optical axis 115 of the optical circuit 110. The image capturing range 310 of the peripheral resolution region is configured such that the region on the +Z side of the moving body 10 is narrow with respect to the optical axis 115 of the optical circuit 110, and the region on the −Z side is made wider. That is, the image capturing range in a first direction orthogonal to the optical axis 115 of the optical circuit 110 is relatively narrow, and an image capturing range in a second direction opposite to the first direction is relatively wide.

Figure 3A:
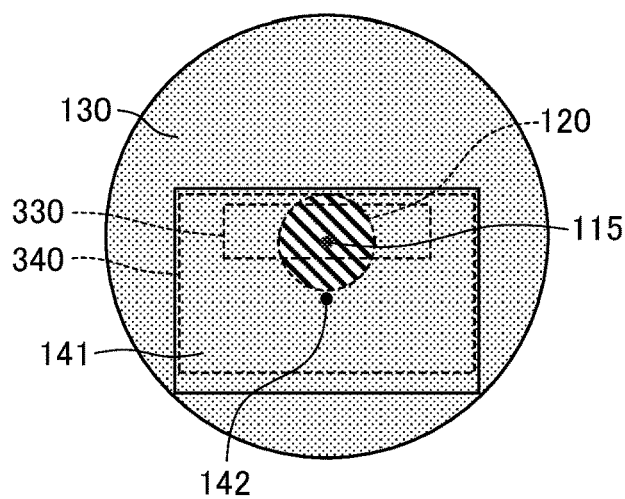
FIGS. 3A, 3B, and 3C are diagrams showing a positional relationship between an image capturing circuit and an image formation range of an optical circuit.
Figure 3B:
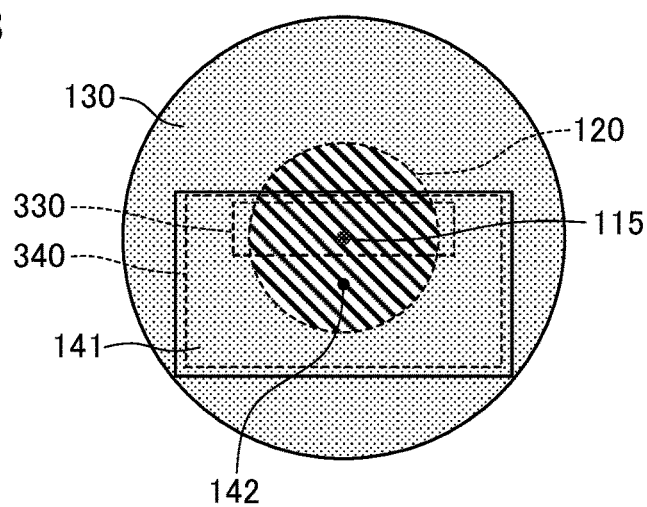
Figure 3C:
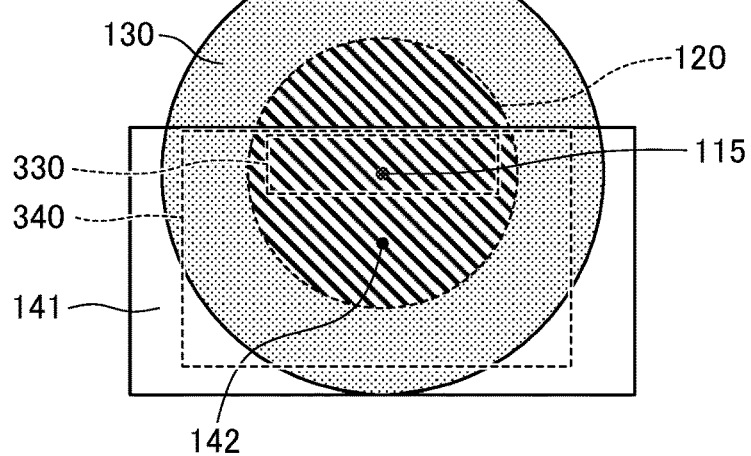

FIGS. 3A, 3B, and 3C are schematic diagrams showing a positional relationship between the image capturing circuit 140 and a subject image formed by the optical circuit 110. The optical axis 115 corresponds to the optical center of the optical circuit 110 of the image acquisition circuit 100. A light receiving surface center 142 of the image capturing circuit 140 is disposed at a position displaced vertically with respect to the optical axis 115. In FIGS. 3A, 3B, and 3C, a light receiving surface center 142 is positioned below the optical axis 115. The light receiving surface center 142 is the center of the light receiving surface 141 of the image capturing circuit 140 that is a photoelectric conversion area.

The optical circuit 110 includes a high resolution region 120 and a peripheral resolution region 130. With respect to the high resolution region 120, a signal is acquired from the image capturing circuit 140, and the signal processing unit 145 converts the image signal and generates an image of the image capturing range 300 of the high resolution region. In addition, with respect to the peripheral resolution region 130, a signal is acquired from the image capturing circuit 140, and the signal processing unit 145 converts the image signal and generates an image of the image capturing range 310 of the peripheral resolution region.

By intentionally displacing the light receiving surface center 142 of the image capturing circuit 140 with respect to the optical axis 115, the image capturing range 310 of the peripheral resolution region shown in FIG. 1 can be asymmetrically set in the vertical direction (Z-axis direction) with respect to the optical axis 115. The image acquisition circuit 100 is disposed at a rear portion of the moving body 10. That is, the image acquisition circuit 100 is positioned in the vicinity of the upper end within the opening range of the rear window portion 50 capable of ensuring the field of view of the driver 500 operating the moving body 10. This position is close to the line of sight height of the driver 500 and is suitable for the driver to look rearward. In addition, the image capturing range 310 of the peripheral resolution region includes a tangent 350 between the outermost front lens of the optical circuit 110 of the image acquisition circuit 100 and the rear outside portion of the moving body 10. This indicates that a portion of the moving body 10 is always included in the image capturing range 310 of the peripheral resolution region.

The image signal input from the image acquisition circuit 100 to the image processing apparatus 160 (FIG. 2) is processed under the control of the control unit 170. As shown in FIG. 3A, the data of a first output region 330 indicated by a dotted line frame including the high resolution region 120 formed mainly on the light receiving surface 141 of the image capturing circuit 140 is extracted, and the data of the region is output to the first display 400. Similarly, the data of the second output region 340 indicated by a dotted line frame including the first output region 330 is output to the second display 410. The second output region 340 is a region that is extracted in a range wider than the first output region 330 or a region including all of an image. The first display 400 includes, for example, a display device for confirming and monitoring the rearward direction during normal traveling of an electronic room mirror and the like, and is disposed near the line of sight of the driver 500. In addition, the first display 400 includes a room mirror mode having a function as a mirror, and an electronic room mirror mode using an image output from the image acquisition circuit 100. In contrast, the second display 410 includes a display device used for peripheral confirmation, such as backup guidance of a car navigation system and the like, and is disposed mainly below the line of sight of the driver 500 in the moving body 10.

With respect to the high resolution region 120 and the peripheral resolution region 130, for example, as shown in FIG. 3A, the high resolution region 120 is contained entirely in the light receiving surface 141, and the peripheral resolution region 130 is configured to entirely cover the light receiving surface 141. Alternatively, as shown in FIG. 3B, there is a configuration in which a portion of the high resolution region 120 protrudes from the light receiving surface 141. In addition, as shown in FIG. 3C, there is a configuration in which both the high resolution region 120 and the peripheral resolution region 130 both cover only a portion of the light receiving surface 141. The relationship between the high resolution region 120 and the peripheral resolution region 130 and the light receiving surface 141 changes the image capturing range 300 of the high resolution region and the image capturing range 310 of the peripheral resolution region. Further, in the present embodiment, although the optical axis 115 of the optical circuit 110 and the light receiving surface center 142 are configured to be vertically displaced, in accordance with the application, for example, a configuration in which they are displaced laterally, or a configuration in which they are displaced obliquely and the like is also possible.

Figure 4:
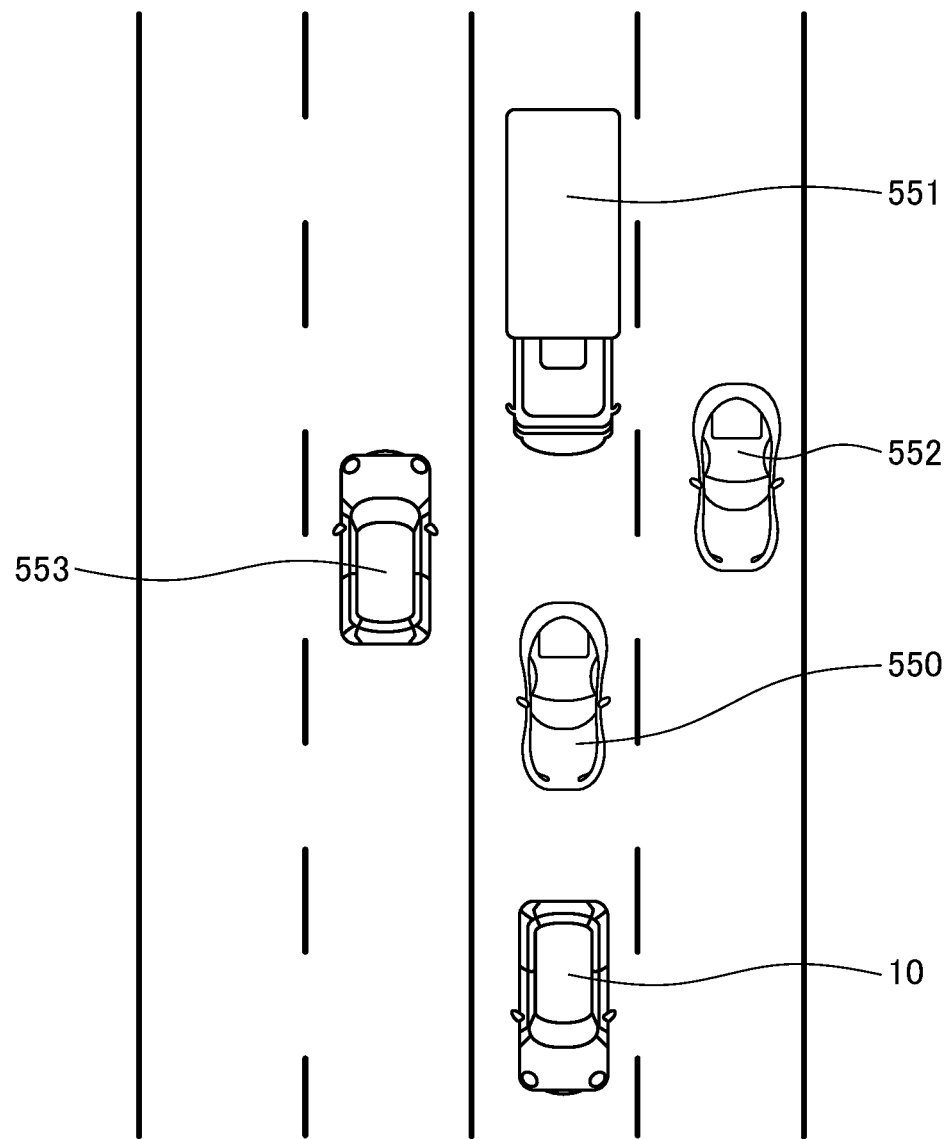
FIG. 4 is a top view of a moving body and peripheral moving bodies when traveling on a road.
Figure 5:
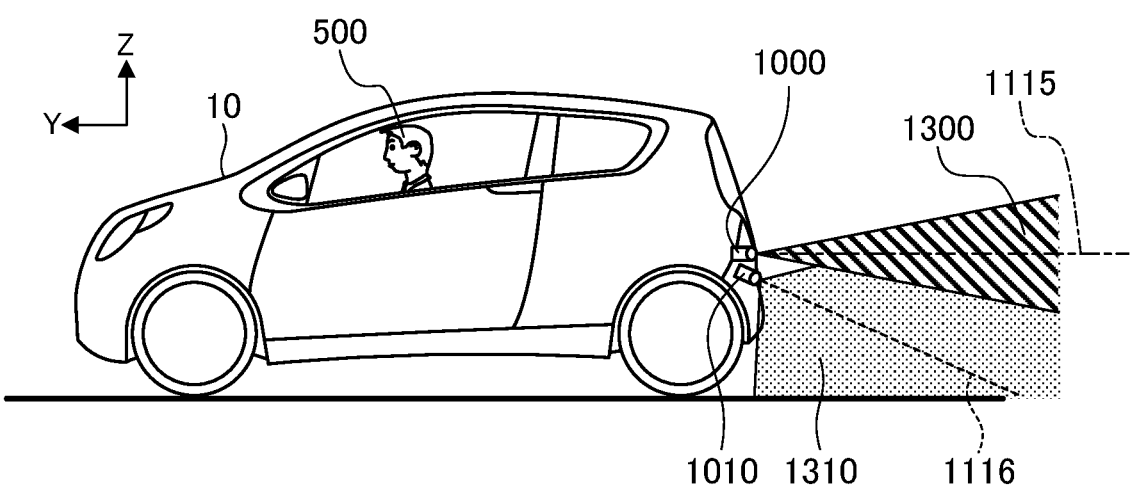
FIG. 5 is a side view showing a moving body according to a comparative example.
Figure 6:
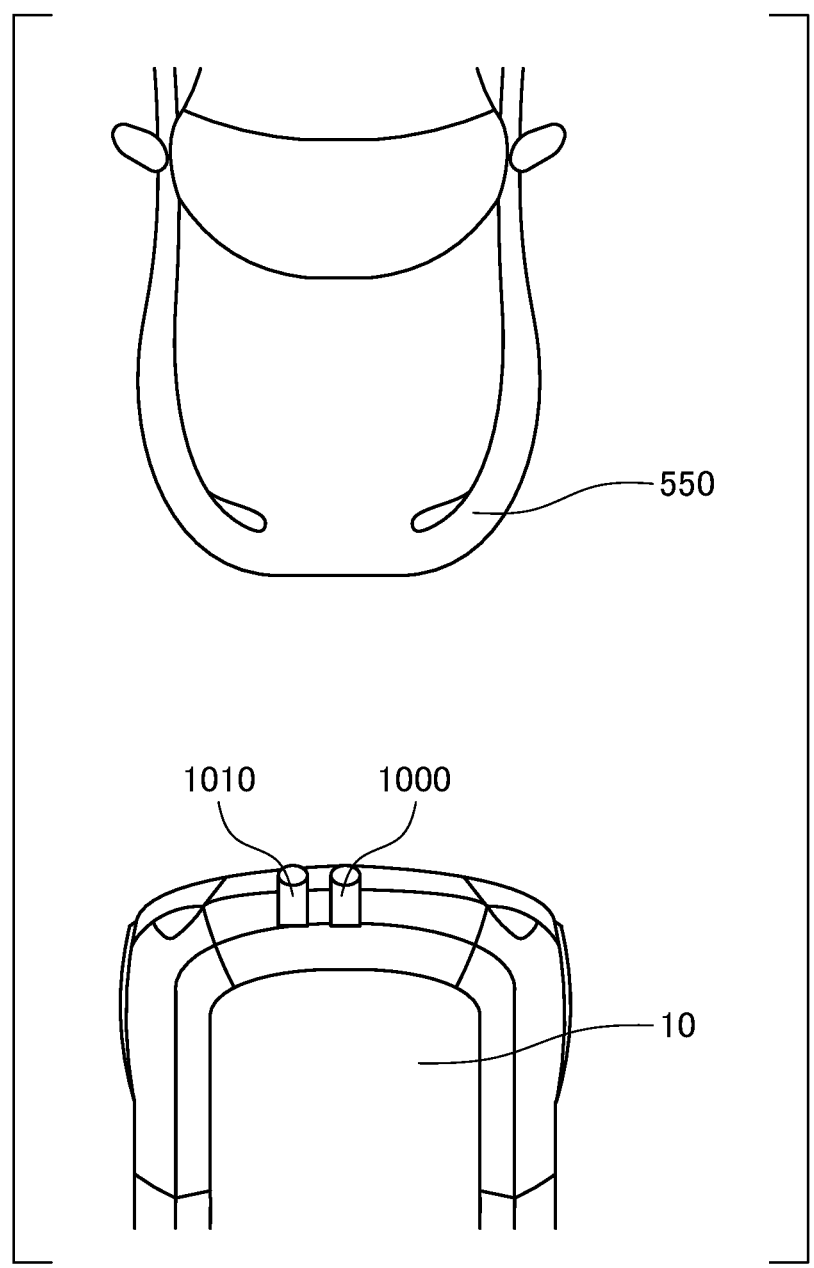
FIG. 6 is a top view of a moving body and a following moving body according to a comparative example in the situation of FIG. 4.
Figure 7:
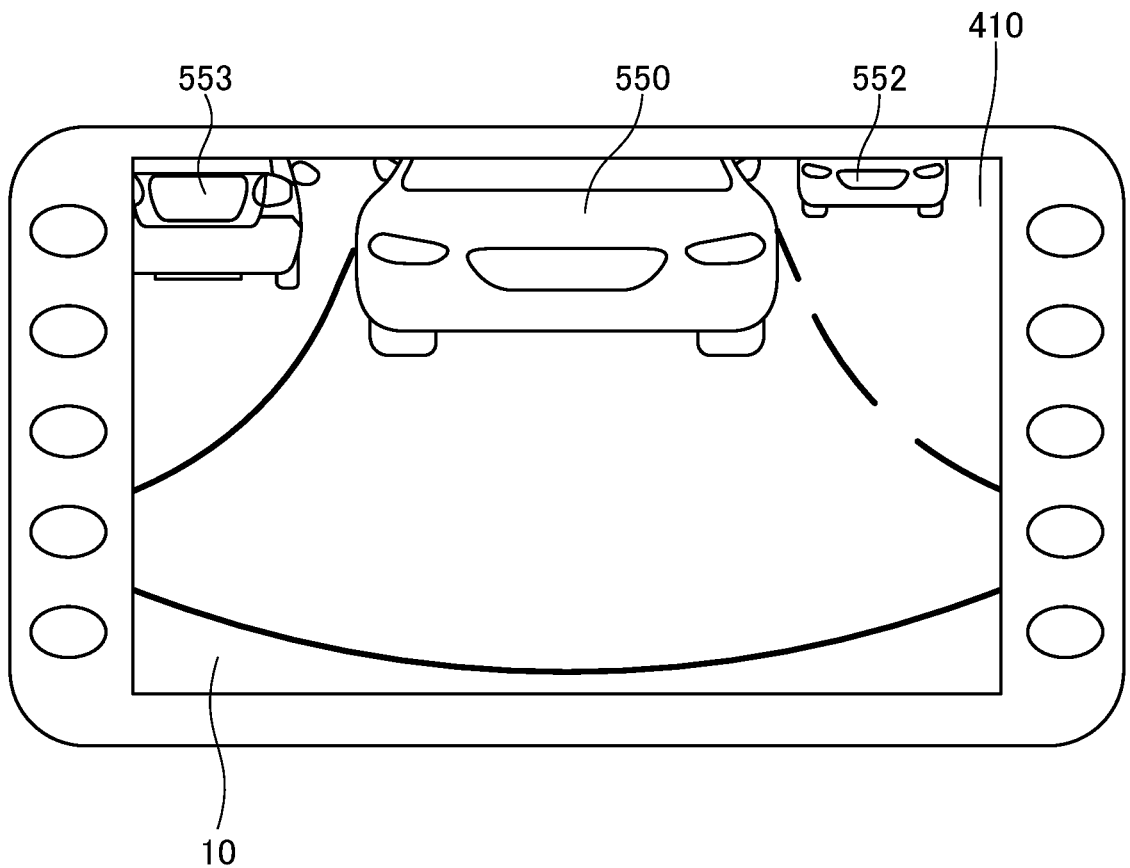
FIG. 7 is a diagram showing a display example of a second display mounted on a moving body according to a comparative example in the situation of FIG. 4.
Figure 8:
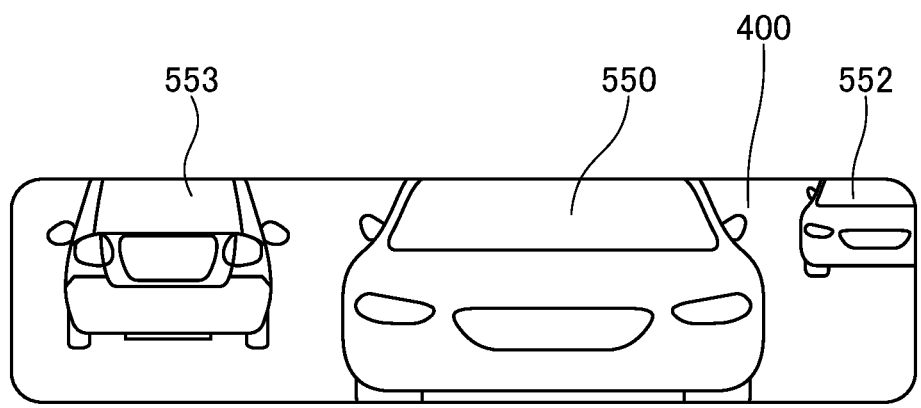
FIG. 8 is a diagram showing a display example of a first display mounted on a moving body according to a comparative example in the situation of FIG. 4.

With reference to FIGS. 5 to 8, a display processing of an imaging assembly will be described with reference to a comparative example. FIG. 4 is a top view of a moving body 10 traveling on a road and other moving bodies in the vicinity thereof. The traveling direction of the moving body 10 is defined as the downward direction in FIG. 4. FIG. 5 is a side view showing a moving body according to a comparative example. FIG. 6 is a top view of a moving body and a following moving body according to a comparative example in the situation of FIG. 4. FIG. 7 shows a display example of the second display 410 mounted on a moving body according to a comparative example in the situation of FIG. 4. FIG. 8 shows a display example of the first display 400 mounted on a moving body according to a comparative example in the situation of FIG. 4.

As shown in FIG. 5, in the moving body 10 of the comparative example, both an image acquisition circuit 1000 for the first display for performing confirming and monitoring the rearward direction during traveling, and an image acquisition circuit 1010 for the second display for backup guidance and peripheral confirmation are attached. Hereinafter, an image acquisition circuit for the first display is referred to as a "first camera", and an image acquisition circuit 1010 for the second display is referred to as a "second camera". A field of view of the first camera 1000 is a first image capturing range 1300 having a first optical axis 1115 parallel to the horizontal direction. A field of view of the second camera 1010 is a second image capturing range 1310 having a second optical axis 1116 facing downward toward the back with respect to the horizontal direction. That is, each is configured to include an image acquisition circuit having a different optical axis and image capturing range in accordance with application. Normally, the second image capturing range 1310 is disposed so that an image of the moving body 10 is included in a portion thereof. Thus, the driver 500 can confirm the positional relationship between the moving body 10 and an object at the rear thereof.

The first camera 1000 and the second camera 1010 shown in FIG. 5 are disposed on the lower side (−Z side) of the rear portion of the moving body 10. For example, as shown in FIG. 4, a case is assumed in which vehicles A 550, B 551, C 552, and D 553 are present to the rear of the moving body 10. In this case, as shown in FIG. 8, a portion of the following vehicle A 550 is displayed in the first display 400, and becomes a display image in which the upper portion is missing. In addition, the image of the vehicle B 551 to the rear thereof is not displayed. Furthermore, when an image with a headlight of the vehicle A 550 is displayed on the first display 400, there is a possibility that a problem such as blocking the field of view of the driver 500 due to glare may occur. In addition, in the room mirror mode and electronic mirror mode included in the first display 400, because the height of line of sight of the driver 500 and the disposed height of the first camera 1000 are different from each other and the viewpoint height is different in each mode, the appearance is changed. Therefore, there is a possibility that a driver 500 accustomed to the function of a room mirror may not grasp a rearward condition at the moment when a mode of the first display 400 is switched from a room mirror mode to an electronic room mirror mode.

In addition, a portion of the moving body 10 is displayed on the lower side in the second display 410 (FIG. 7), and the driver 500 can confirm the positional relationship with the following vehicle A 550. However, because the second camera 1010 is disposed at a low position, it is difficult for the driver 500 to confirm the conditions behind the moving body 10 without a sense of incongruity. Furthermore, as shown in FIG. 6, it is necessary to arrange the first camera 1000 and the second camera 1010 so as not to overlap each other. Because the viewpoint of the video of the first display 400 and the second display 410 is displaced in the lateral direction corresponding to the difference in camera arrangement, for example, there is a possibility that a problem occurs wherein a rearward vehicle C 552 appears only on a portion of a display screen (FIGS. 7 and 8) and is difficult to visually recognize.

Figure 9:
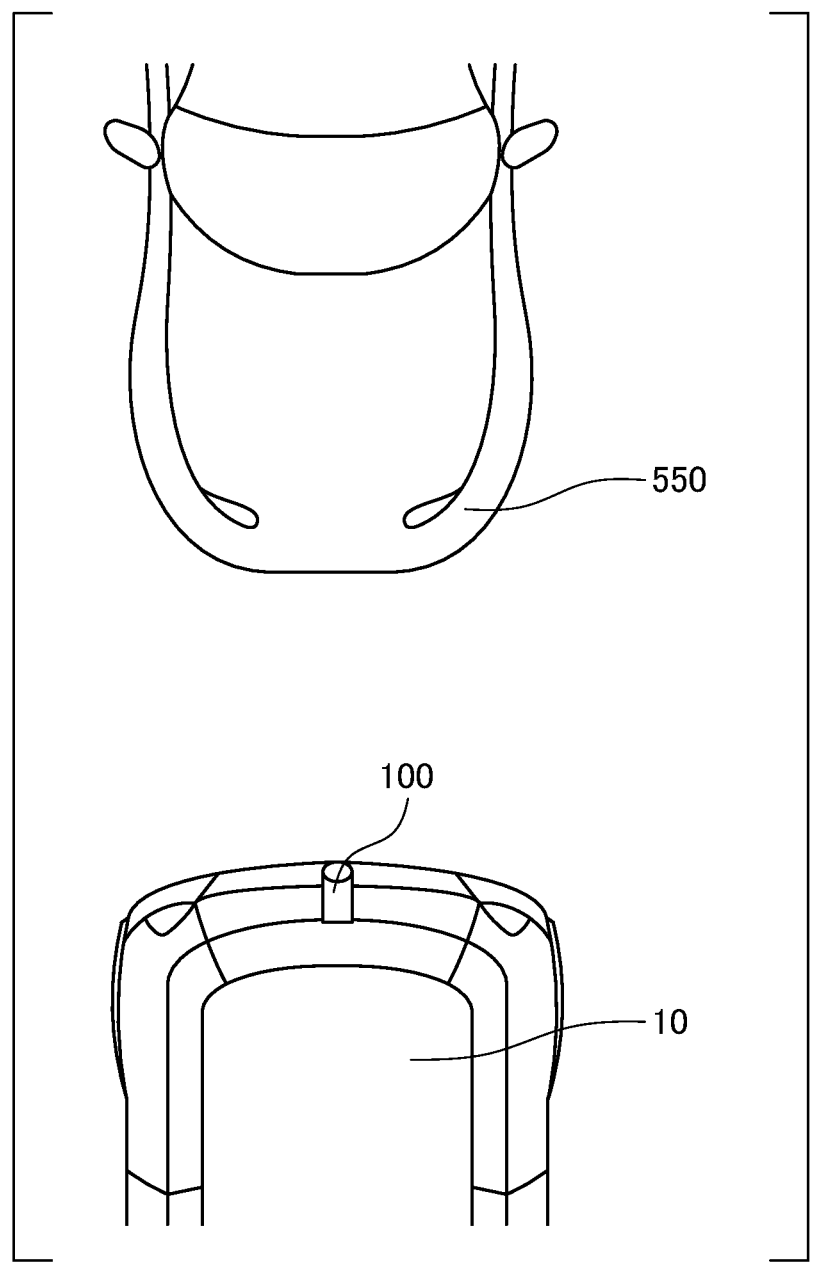
FIG. 9 is a top view of a moving body and a following moving body according to the first embodiment in the situation of FIG. 4.
Figure 10:
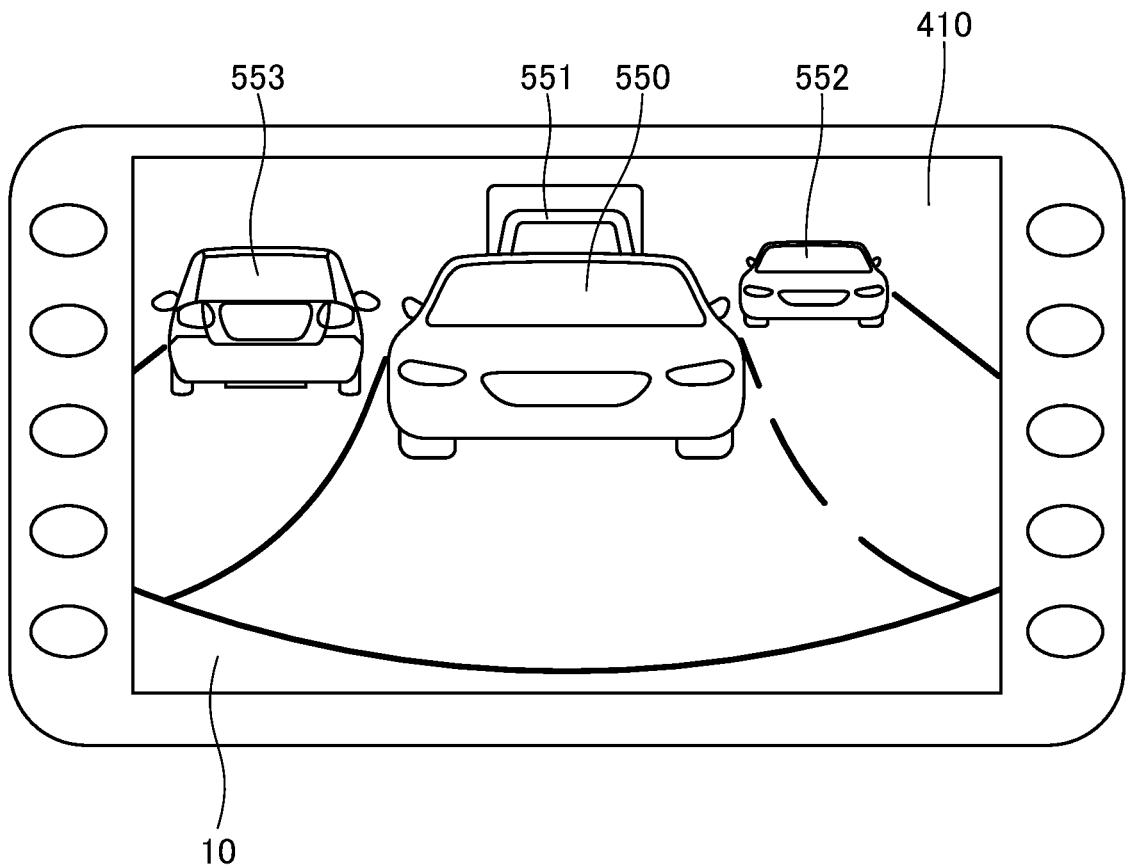
FIG. 10 is a diagram showing a display example of a second display mounted on a moving body according to a first embodiment in the situation of FIG. 4.
Figure 11:
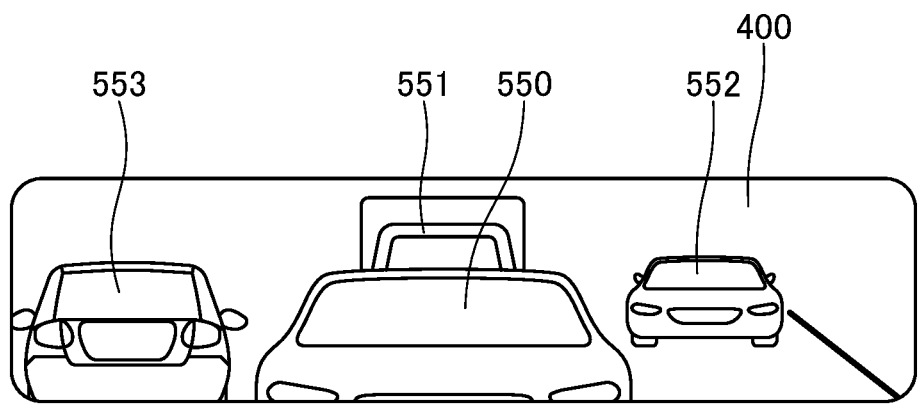
FIG. 11 is a diagram showing a display example of a first display mounted on a moving body according to a first embodiment in the situation of FIG. 4.

Referring to FIGS. 9 to 11, the display processing of the imaging assembly according to the present embodiment will be explained. FIG. 9 is a top view of a moving body 10 in the situation of FIG. 4. FIG. 10 shows a display example of a second display 410 mounted on a moving body 10 in the situation of FIG. 4. FIG. 11 shows a display example of a first display 400 mounted on a moving body 10 in the situation of FIG.

As shown in FIG. 9, one image acquisition circuit 100 is disposed at the rear portion of the moving body 10 according to the present embodiment. The image acquisition circuit 100 is mounted above the rear window portion 50 of the moving body 10 (FIG. 1, FIG. 11). Thereby, the first display 400 can display an image not only of the vehicle A 550 following the moving body 10, but also an image of the vehicle B 551 following thereof (FIG. 11), and the driver 500 can recognize the presence of the vehicle B 551. In addition, because the image capture apparatus 100 is disposed close to the line of sight of the driver 500, the driver 500 can easily recognize the positional relationship between the vehicle C 552 and the vehicle D 553 in the rearward direction. Furthermore, because the viewpoint height when the first display 400 is switched from the room mirror mode to the electronic mirror mode is close (the difference between viewpoint heights is small), the sense of incongruity as viewed from the driver 500 is reduced.

As shown in FIG. 10, in the second display 410 as well, because the image of a portion of the moving body 10 is displayed on the lower side, the positional relationship with the following vehicle A 550 can be easily confirmed. Because the image of the following vehicles B 551, C 552, and D 553 is an image viewed from a high place, the driver 500 can more easily recognize rearward positional relationships.

As shown with reference to FIG. 9 and as explained in FIG. 1, the image acquisition circuit 100 is formed as a single apparatus, and can output an image signal in a different range in accordance with the application. A deviation in the lateral direction of the first display 400 and the second display 310 does not exist, and even when an image is displayed on both the first display 400 and the second display 410, the driver 500 does not have a sense of incongruity and a mistake in recognition is less likely to occur.

In the present embodiment, although a case where the driver 500 visually recognizes a display screen is described, for example, even in machine learning and the like, the arrangement of the image acquisition circuit 100 is easy to recognize if the arrangement is the same as that described above, and application to automatic driving and the like is possible.

Figure 12:
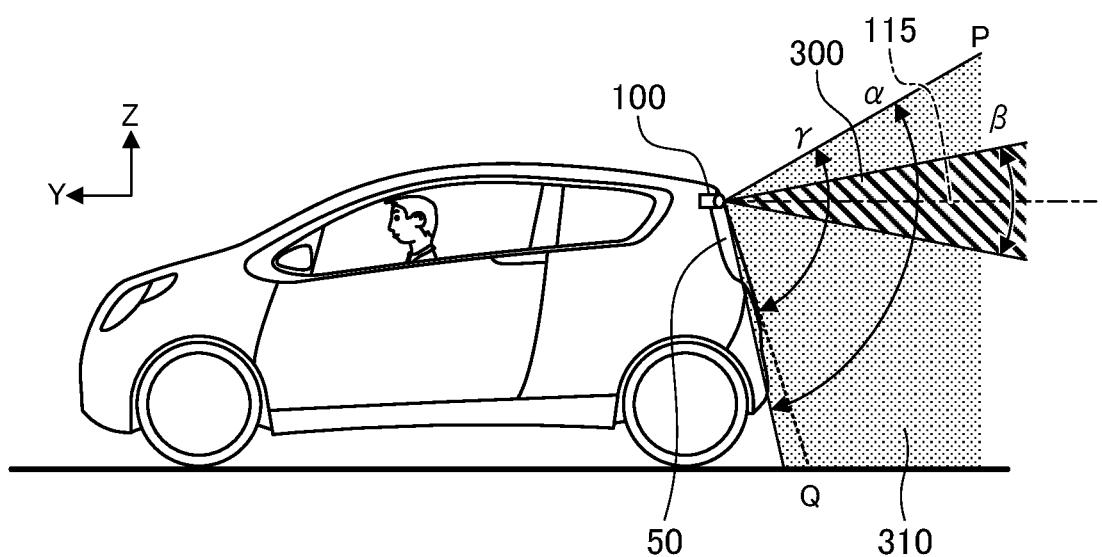
FIG. 12 is a diagram showing a moving body and an image capturing range of an imaging assembly according to the first embodiment.

FIG. 12 is a side view showing the relationship between a moving body and an image capturing range of an imaging assembly according to a first embodiment. An angle view of the image capturing range 310 of a peripheral resolution region in a Y-Z plane of the image acquisition circuit 100 is represented as a, and an angle view of an image capturing range 300 of a high resolution region is represented as (3. The relationship is "α>β". In addition, an angle formed by a line P indicating the upper end of the image capturing range 310 of the peripheral resolution region and a line Q in contact with the front end portion (the outermost portion) of the optical circuit 110 of the image acquisition circuit 100 and the rear end portion of the moving body 10 is represented as γ. The image acquisition circuit 100 is disposed so as to have a relationship of "α≥γ". As described above, because an image of a portion of the moving body 10 is displayed on the second display 410, the positional relationships around the moving body 10 are made easy to understand.

Figure 13A:
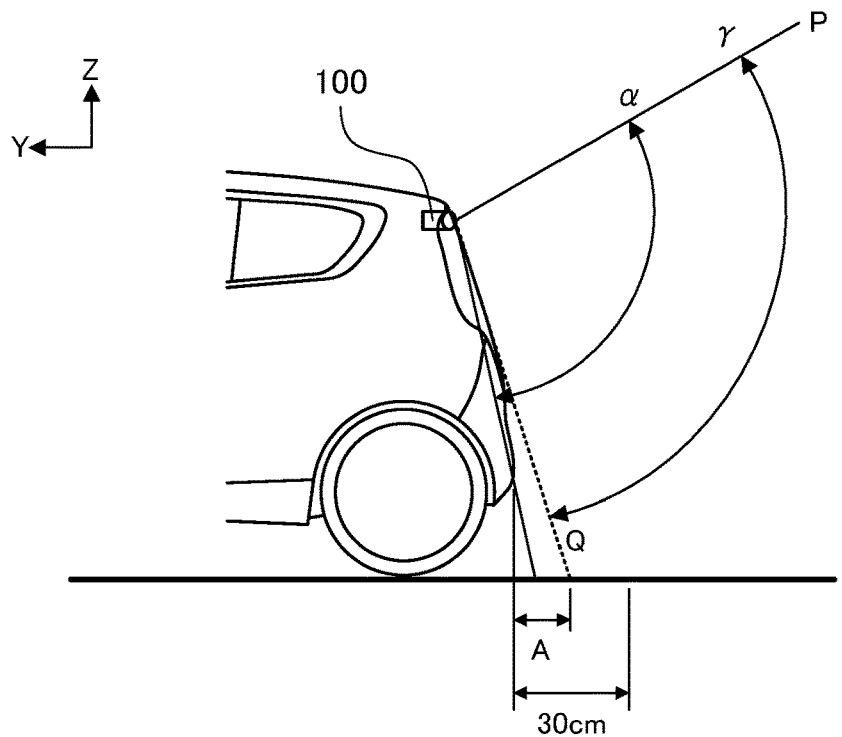
FIGS. 13A and 13B are side views showing the relationship between an installation position of the image acquisition circuit and the ground surface in the rear portion of the moving body according to the first embodiment.
Figure 13B:
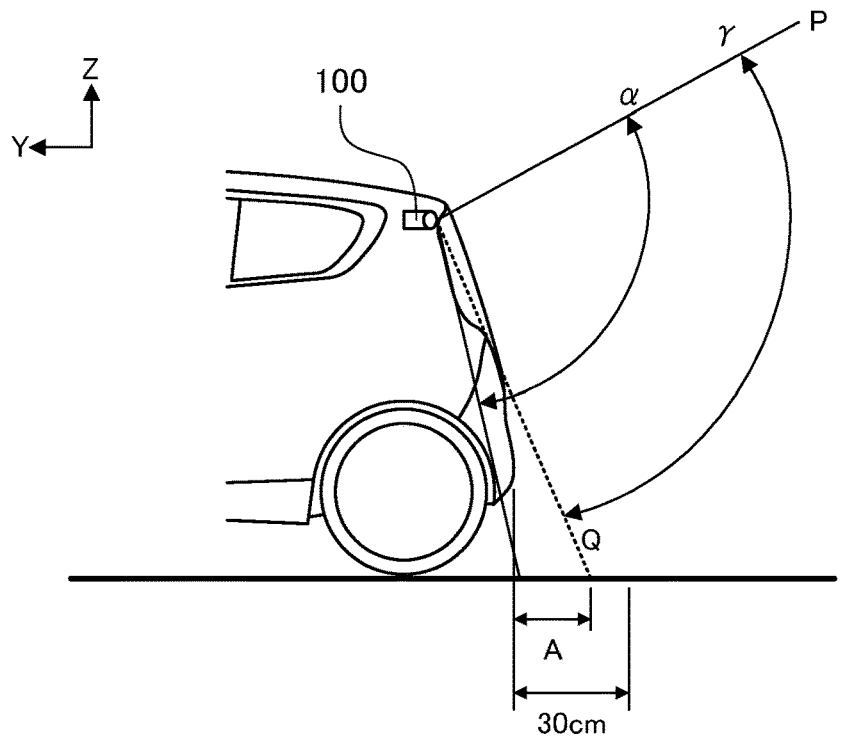

FIGS. 13A and 13B are side views showing a relationship between an installation position of the image acquisition circuit 100 in the rear portion of a moving body and the ground surface according to the present embodiment. FIG. 13A schematically shows a rear portion of the moving body 10 and a road surface. With the rear portion of the moving body 10 as a reference, the distance from the front end portion of the optical circuit 110 of the image acquisition circuit 100 to a point where the line Q in contact with the moving body 10 intersects the road surface is represented by A. For example, the relationship is "A≤30 [cm]". The upper limit value with respect to the distance A can be set to an arbitrary value. This condition specifies a range deviating from an angle of view of the image acquisition circuit 100, and it is possible to narrow a range that becomes a blind spot by further reducing the upper limit value.

FIG. 13B shows a case where the image acquisition circuit 100 is disposed closer to the +Y side within an opening range in the Y-axis direction of the rear window portion 50 as compared with FIG. 13A. That is, the image acquisition circuit 100 is disposed further to the front side than the rear end portion of the moving body 10 in the traveling direction of the moving body 10, for example, inside the moving body 10. Even in this case, the image acquisition circuit 100 can be disposed within a range in which the relationship "A≤30 [cm]" is established. Because the front end portion (outermost portion) of the optical circuit 110 of the image acquisition circuit 100 is disposed closer to the +Y side than the rear end of the moving body 10, there is an advantage that damage to and destruction of the image acquisition circuit 100 due to flying rocks and the like can be avoided, and design properties can be ensured.

Figure 14C:
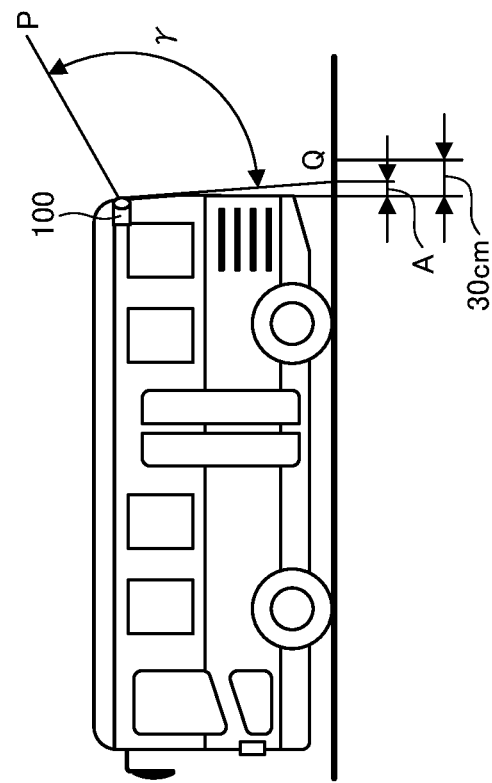
FIGS. 14A, 14B, and 14C are side views showing an arrangement example of various vehicle shapes with respect to the relationship between FIGS. 13A and 13B.
Figure 14A:
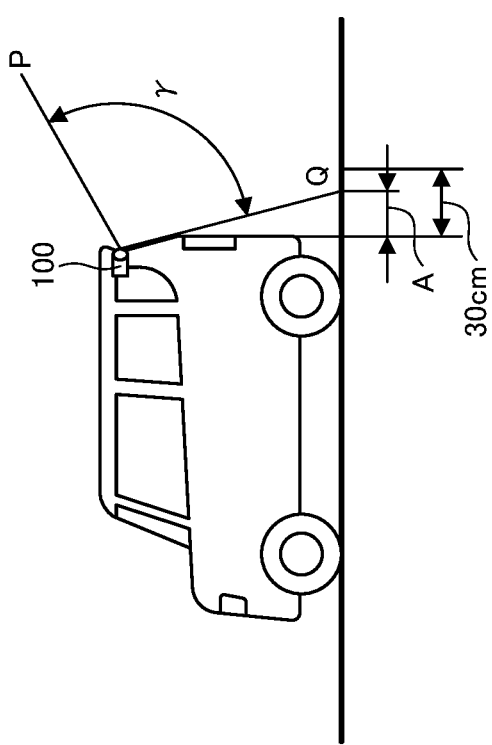
Figure 14B:
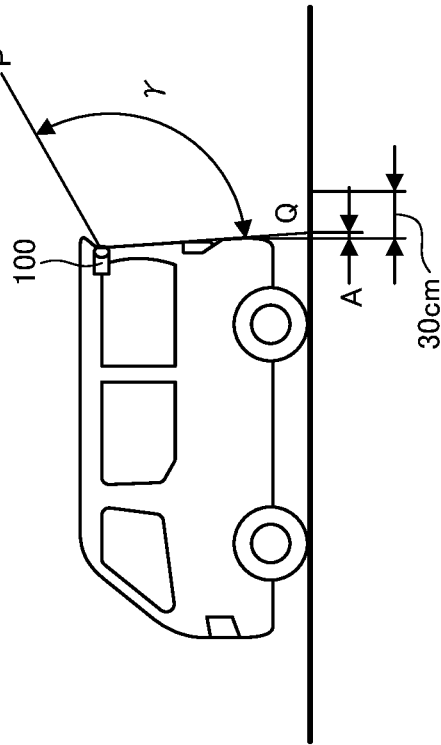

FIGS. 14A, 14B, and 14C show an example when the arrangement of the imaging assembly of the present embodiment is applied to vehicles having various shapes. In the vehicle of each type shown in FIGS. 14A, 14B, and 14C as well, it is possible to obtain the same effect as described above by disposing the image acquisition circuit 100 within the opening range in the Y-axis direction of the rear window portion 50 so that "α≥γ" and the relationship "A≤30 [cm]" is established. For example, in the large size vehicle shown in FIG. 14C, the angle of view a (not shown) of the image capturing range 310 of the peripheral resolution region of the image acquisition circuit 100, and the angle γ formed by the line P indicating the upper end of the image capturing range 310 and the line Q in contact with the front end portion of the optical circuit 110 and the moving body 10 satisfies the relationship "A≤γ". With the rear end of the large vehicle as a reference, the distance A to the point where the line Q, which is tangent to the front end portion of the optical circuit 110, and the rear end of the vehicle, intersects the road surface, satisfies the relationship "A≤30 [cm]". Note that the present embodiment is not limited to the examples of FIGS.

14A, 14B, and 14C, and can be similarly applied to, for example, a case in which an opening portion is provided on the side surface of a moving body.

Figure 15A:
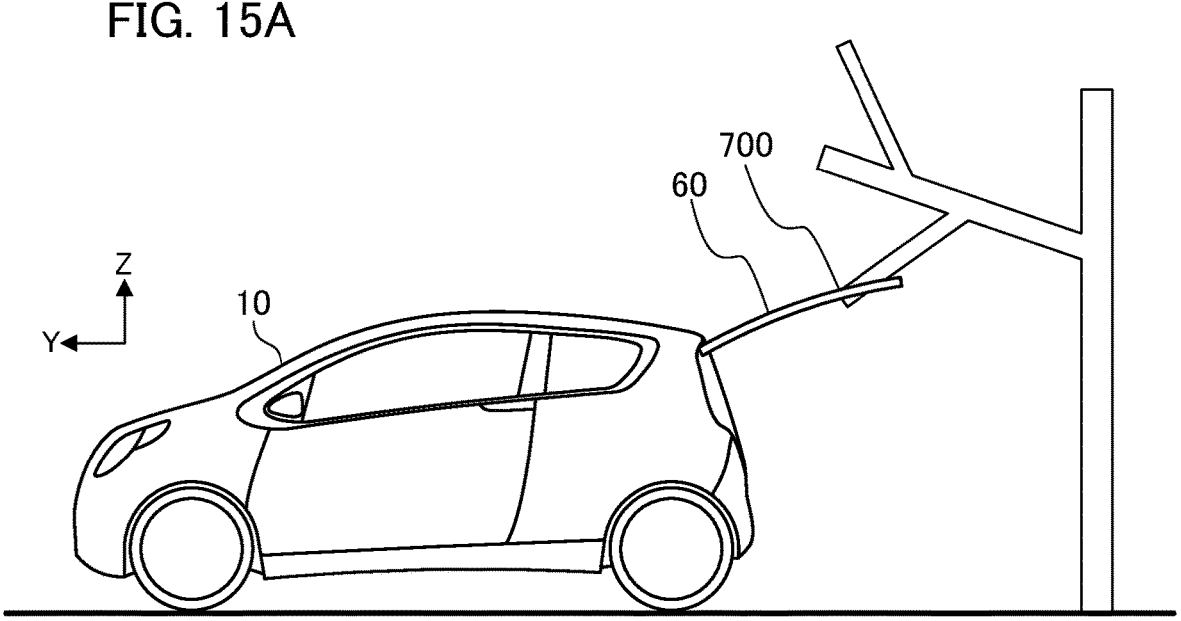
FIGS. 15A and 15B are side views showing a relationship between a moving body in a state in which the back door is opened.
Figure 15B:
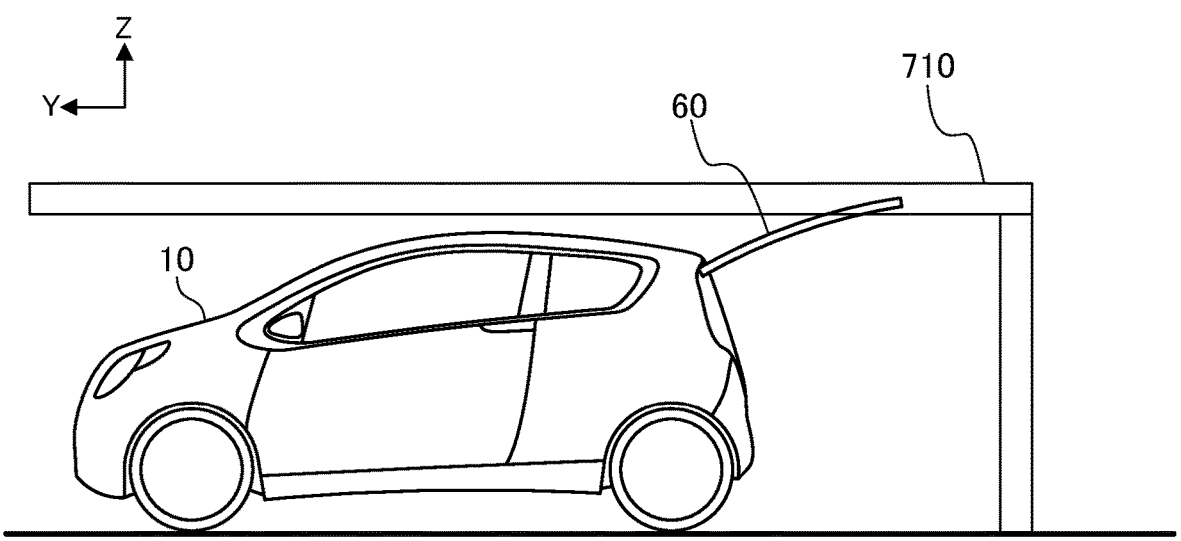

FIGS. 15A and 15B are side views showing the relationship between a moving body and an obstacle according to a comparative example in which the moving body is in a state where a back door portion 60 is open. A case in which the moving body 10 is provided with a back door portion 60 including the rear window portion 50 is shown. As an example of an opening/closing member capable of performing an opening/closing operation in a vehicle rear portion, a back door portion 60 provided with a rear windshield in the rear window portion 50 is shown. Although in a conventional obstacle detection method, it is possible to detect the rear of a vehicle, for example, when the back door portion 60 is opened as shown in FIG. 15A, there is a possibility that may come into contact with an obstacle 700 such as a branch of a tree located above the back door portion 60. In addition, as shown in FIG. 15B, in a parking lot with a low ceiling and the like, although no contact with the moving body 10 itself occurs, there is a possibility of contact with an obstacle 710 that is above when the back door portion 60 is opened.

Figure 16:
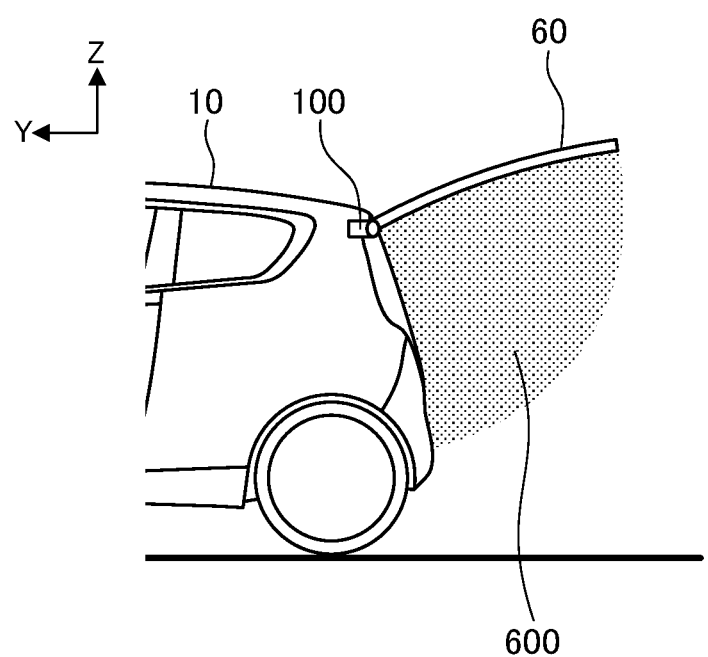
FIG. 16 is a side view showing a movement range of a back door when the back door is opened and closed according to the first embodiment.
Figure 17A:
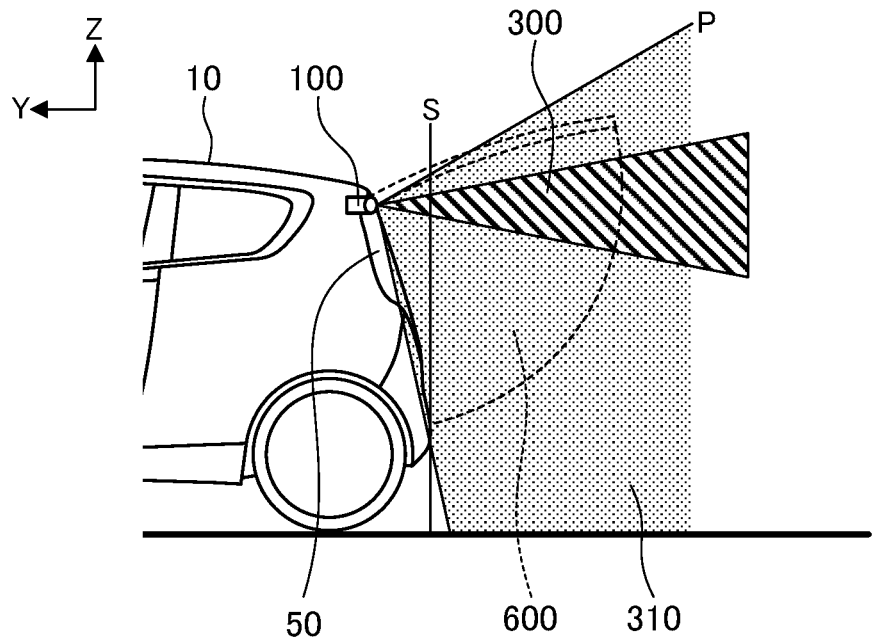
FIGS. 17A and 17B are diagrams showing the relationship between the movement range when the back door is opened and closed, and the angle of view of the image acquisition circuit according to the first embodiment.
Figure 17B:
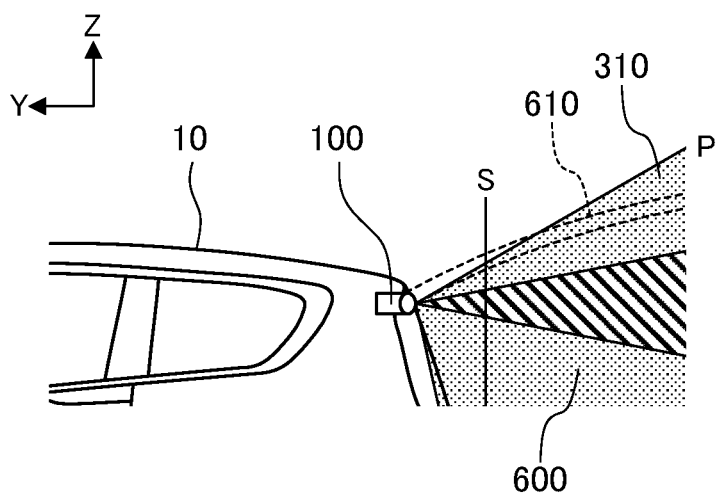

With reference to FIGS. 16, 17A, and 17B, the relationship between the movement range of the back door portion 60 of the moving body 10 and the image capturing range according to the present embodiment will be explained. FIG. 16 is a side view showing a back door opening/closing movement range 600 (hereinafter, simply referred to as a "movement range"). FIGS. 17A and 17B are side views showing the relationship between a movement range 600 and the image capturing range of the image acquisition circuit 100 when the back door portion 60 is opened/closed. In FIGS. 17A and 17B, the line S is a straight line that is in contact with the rear end in the Y-axis direction of the moving body 10 and is parallel to the Z-axis direction, and the line P is a straight line that indicates the upper end of the image capturing range 310 of the peripheral resolution region.

As shown in FIG. 17A, when the back door portion 60 transitions from a closed state to an open state, it moves across the movement range 600. FIG. 17B is an enlarged view of the rear upper portion of the moving body 10 shown in FIG. 17A. The image acquisition circuit 100 is disposed near the upper end within the opening range in the Y-axis direction of the rear window portion 50. As a result, the image capturing range 310 of the peripheral resolution region of the image acquisition circuit 100 can include all of the movement range 600 further to the rear side of the line S that indicates the rear end position in the Y-axis direction of the moving body 10, that is, on the –Y side.

As shown in FIG. 17B, most of the upper end surface 610 of the movement range 600 is a lower side (–Z side) than the line P indicating the upper end of the image capturing range 310, and is in a region further to the rear side (–Y side) of the line S. That is, the image acquisition circuit 100 is disposed in the state shown in FIG. 17B, and an image capturing range 310 of the peripheral resolution region thereof is set. As a result, an image of all the movement range 600 behind the rear end of the moving body 10 is captured, and the captured image can be confirmed. In addition, because a portion (rear end portion) of the moving body 10 is set to be always included in the image capturing range 310 of the peripheral resolution region, a positional relationship between the moving body 10 and an object behind thereof can be confirmed. In FIGS. 17A and 17B, what is termed a hatchback type back door is illustrated as a representative example. However, the disclosure is not limited to this example, and can also be similarly applied to, for example, a single opening or a double hinged type back door, or a gullwing type back door.

According to the present embodiment, it is possible to provide a moving body and an imaging assembly having an optical circuit and an angle of view usable for both a rear monitoring camera and a display for the captured rearward image, and that is disposed in an easy to use position.

Second Embodiment

A second embodiment will be explained with reference to FIGS. 18 to 21. The present embodiment mainly describes differences from the first embodiment, and constituent elements similar to those in the first embodiment are represented by the same reference numerals or symbols, and their detailed descriptions are omitted.

Figure 18:
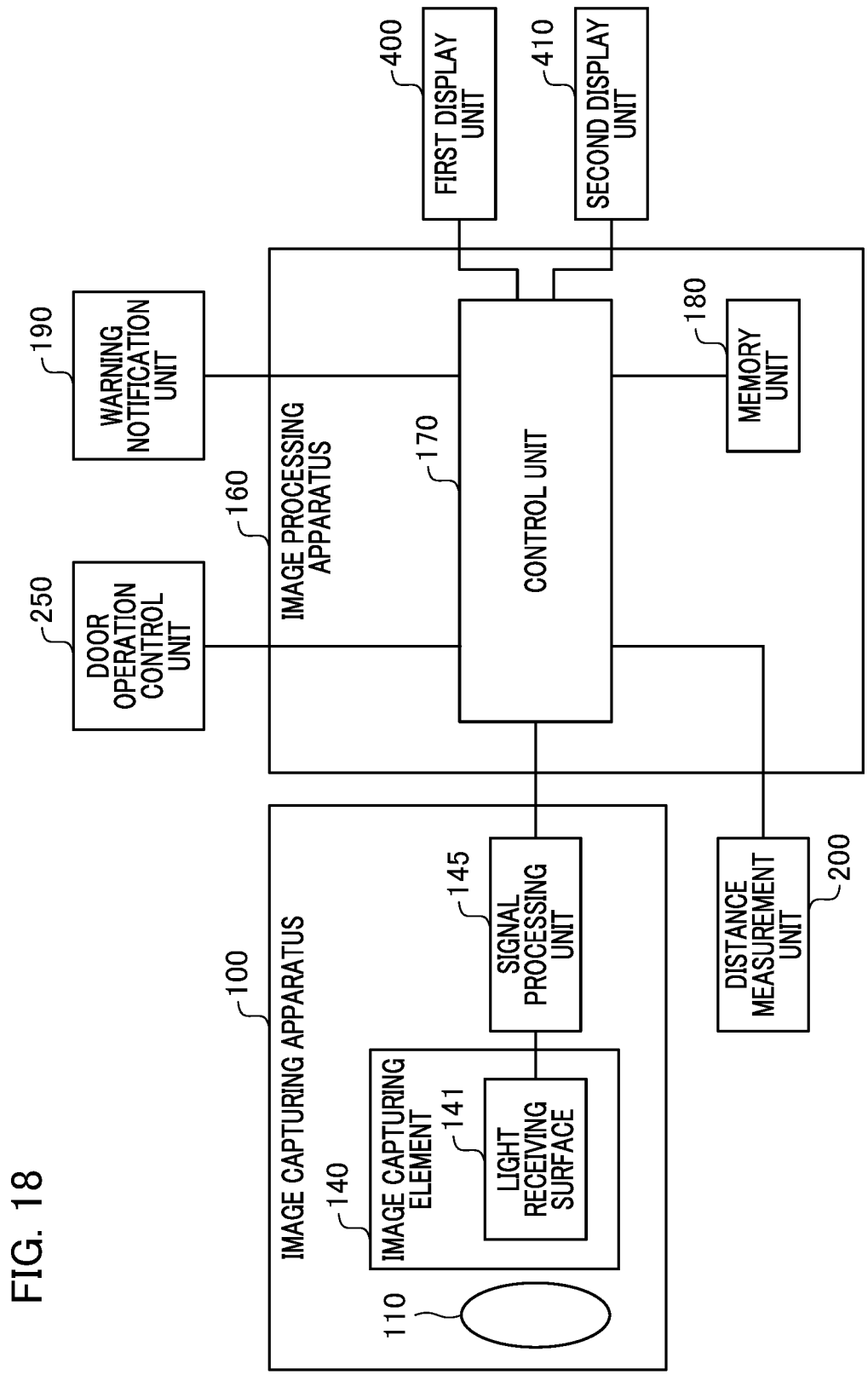
FIG. 18 is a system configuration diagram of an imaging assembly according to a second embodiment.

FIG. 18 is a system configuration diagram of an imaging assembly according to the present embodiment. The point of difference from the first embodiment is the point that a warning notification unit or circuit 190 and a distance measurement unit or circuit 200 are provided. The warning notification unit 190 is electrically connected to the control unit 170 of the image processing unit 160, and performs warning alarm processing under the control of the control unit 170. The warning notification unit 190 is, for example, provided with a buzzer configured to generate sound, and outputs a warning sound to the driver 500 and fellow passengers. Alternatively, the warning notification unit 190 outputs a warning display signal to the first display 400 or the second display 410 to notify the driver 500 and fellow passengers. Note that a known configuration for alerting the driver 500 or the like can be used.

The distance measurement unit or circuit 200 is electrically connected to the control unit 170 of the image processing unit or circuit 160, and measures the distance to an object in the vicinity of the moving body 10. With respect to the distance measurement unit 200, an apparatus of a system for calculating distance information based on information acquired from an image capturing circuit 140 of the image acquisition circuit 100 is known. In the present embodiment, a distance measurement unit 200 is provided separately, and the distance information of a target object is acquired and output to the control unit 170.

Figure 19:
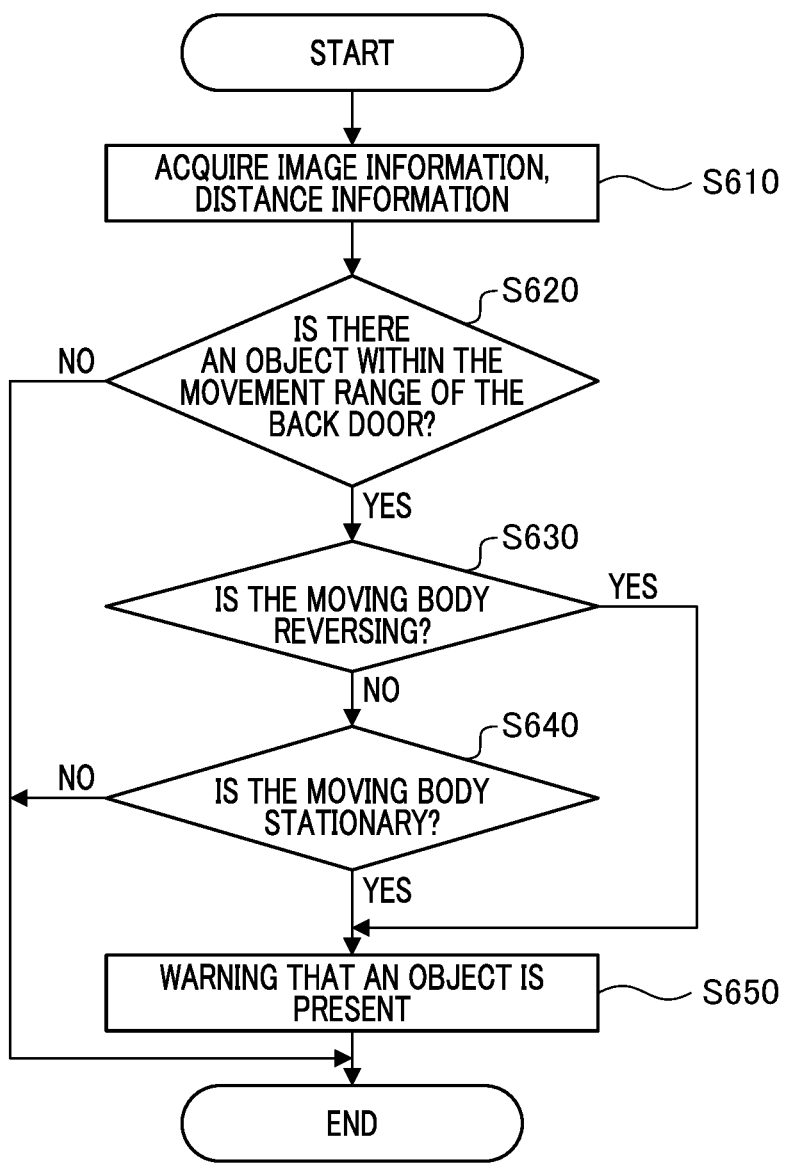
FIG. 19. is a flowchart explaining the control of a warning operation according to the second embodiment.

FIG. 19 is a flowchart explaining control of a warning operation according to the present embodiment. When the moving body and the imaging assembly are in an operating state, the following warning operation is initiated at an arbitrary timing. In step S610, the control unit 170 performs processing to acquire image information from the image acquisition circuit 100 and distance information from the distance measurement unit 200, respectively. In step S620, the control unit 170 determines whether or not there is an object within the movement range 600 of the back door at the time of opening/closing based on the acquired information. If it is determined that there is an object within the movement range 600 of the back door, the processing proceeds to step S630, and if it is determined that there is no object within the movement range 600 of the back door, the warning operation is terminated.

In step S630, the control unit 170 determines whether or not the moving body 10 is reversing. If it is determined that the moving body 10 is reversing, the processing proceeds to step S650, and if it is determined that the moving body 10 is not reversing, the processing proceeds to step S640. In step S650, the warning notification unit 190 warns that there is an object within the movement range 600 of the back door, and then terminates the warning operation.

In step S640, the control unit 170 determines whether or not the moving body 10 is stationary. If it is determined that the moving body 10 is not stationary, the warning operation is terminated. If it is determined that the moving body 10 is stationary, in step S650, the warning notification unit 190 warns that there is an object within the movement range 600 of the back door, and then terminates the warning operation.

The above processing of steps S610 to S650 is repeated as appropriate in accordance with a predetermined condition, for example, a change in the image information from the image acquisition circuit 100, or a change in a condition such as a lapse of a predetermined time. In addition, in contrast to the processing of step S620, the processing of steps S630 and S640 may be in a reverse relationship to the order shown in FIG. 19. In the present embodiment, the attention of a driver, a passenger, or a user who is about to open the back door can be alerted, and the opening/closing operation of the back door can be performed more carefully, or the user can be prompted not to open/close the back door.

Next, a system in which a door operation control unit or circuit 250 shown in FIG. 18 is further added will be explained. The door operation control unit 250 is electrically connected to the control unit 170, and controls the opening/closing operation of the back door portion 60. For example, the door operation control unit 250 electrically controls the opening/closing operation of the back door portion 60 using the power of a motor or the like, or controls the opening/closing angle of the back door portion 60. Alternatively, the door operation control unit 250 has the function of controlling an electronic lock that simply enables or disables the opening or closing itself.

Figure 20:
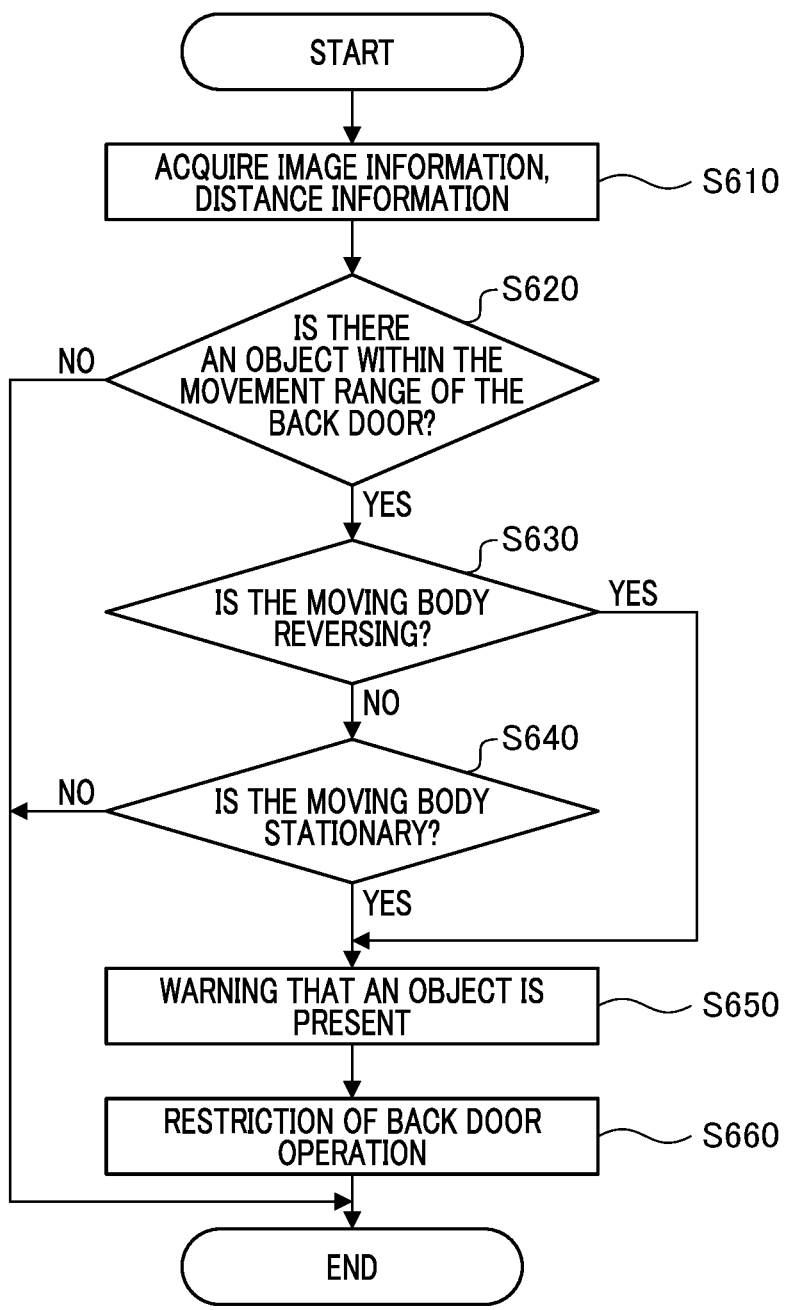
FIG. 20 is a flowchart explaining the control of a warning operation and a back door operation according to the second embodiment.

FIG. 20 is a flowchart explaining processing in a system provided with a door operation control unit 250. The point of difference with FIG. 19 is the point that the processing of step S660 has been added. After the warning processing is executed in step S650, the processing proceeds to step S660. That is, when an object is present in the movement range 600 when the back door is opened or closed, and the moving body 10 is either reversing or is stationary, a warning is not only generated in step S650, but the operation of the back door is restricted in step S660. Restriction of the operation of the opening/closing member by the door operation control unit 250 refers, for example, to prohibiting the opening/closing of the back door, or controlling the opening/closing of the back door within a range in which the back door will not contact the object. A specific example will be described with reference to FIG. 21.

Figure 21:
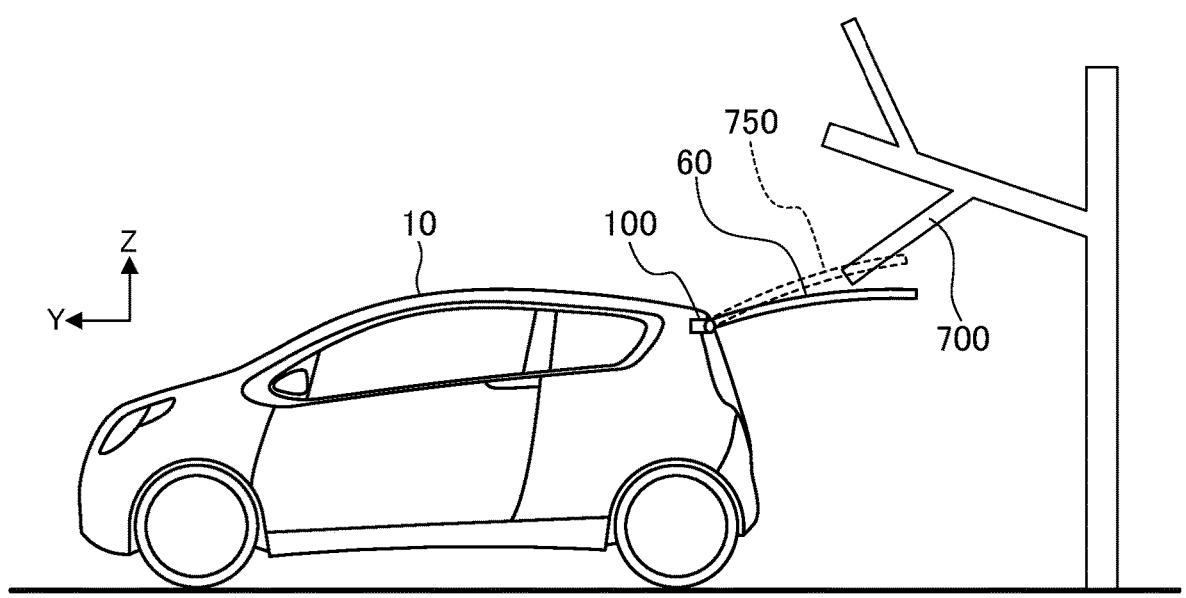
FIG. 21 is a side view showing the relationship between a moving body in a state in which the back door is opened and an obstacle according to the second embodiment.

FIG. 21 is a diagram explaining the restriction of an operation performed by the door operation control unit 250. When this restriction of operation is not performed, the back door portion 60 will open to the normal opening/closing position 750 indicated by the dotted line, and thus will come into contact with the obstacle 700. In contrast, the restriction of the operation performed by the door operation control unit 250 makes it possible to control the opening of the back door portion 60 until before it comes into contact with the obstacle 700 (a state in which there is no contact). This has the advantage that damage to the vehicle can be avoided or minimized, thus allowing the user to open and close the back door portion 60 with peace of mind.

OTHER EMBODIMENTS

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-074345, filed Apr. 26, 2021, which is hereby incorporated by reference wherein in its entirety.

What is claimed is:

1. An imaging assembly mounted on a moving body, the imaging assembly comprising:
    an optical system configured to form an image of a subject in a first region near an optical axis and an image of a subject in a second region outside of the first region in which image forming magnification is relatively lower than the first region, and
    an image capturing element configured to generate image data from an image of the subject formed on a light receiving surface by the optical system,
    wherein the center of the light receiving surface of the image capturing element is displaced in a predetermined direction with respect to an optical axis of the optical system so that the imaging assembly is capable of capturing an image of a rear end portion of the moving body with the second region and an outside portion of the moving body around a horizontal rear direction of the moving body with the first region, and
    wherein the imaging assembly is capable of capturing an image of at least a lower part of a back door portion even in any moving state within a movement range of the back door portion.

2. The imaging assembly according to claim 1, wherein the image capturing circuit is configured to include on a light receiving surface a first output region in which light passing through the first region is incident, and a second output region in which light passing through the second region is incident.

3. The imaging assembly according to claim 2, wherein light passing through the first region is incident and a portion of light passing through the second region is incident, or a portion of light passing through the first region and a portion of light passing through the second region is incident on the light receiving surface.

4. The imaging assembly according to claim 1, wherein the center of the light receiving surface is displaced in a predetermined direction with respect to an optical axis of the optical system, the imaging assembly has a first image capturing range corresponding to the first region; and
    a second image capturing range corresponding to the second region.

5. The imaging assembly according to claim 4, wherein the first image capturing range is an image capturing range centered on an optical axis of the optical system, and
    the second image capturing range is an image capturing range in vicinity of the first image capturing range and is asymmetrically set with respect to the optical axis.

6. The imaging assembly according to claim 5, wherein the second image capturing range is wider in a range of a second direction opposite to the first direction than a range of a first direction orthogonal to the optical axis of the optical system.

7. The imaging assembly according to claim 2, further comprising:
    a first display configured to acquire and display image data of the first output region; and
    a second display configured to acquire and display image data of the second output region.

8. The imaging assembly according to claim 7, further comprising a control circuit for performing control of displaying an image on the first display and the second display,
wherein the control circuit performs control to display an image on the second display based on the image data of the second output region having a wider range than the first output region.

9. The imaging assembly according to claim 8, wherein the image capturing circuit is configured to acquire image data of the second output region by receiving light passing through a portion of or all of the first region and light passing through a portion of the second region.

10. The imaging assembly according to claim 1, wherein the imaging assembly is configured to include an angle of view capable of capturing an image of a portion of the moving body, and a range outside the angle of view does not exceed an upper limit value of a distance from a portion of the moving body.

11. The imaging assembly according to claim 1, wherein the imaging assembly is disposed more towards the front than a rear end portion of the moving body in a traveling direction of the moving body.

12. The imaging assembly according to claim 1, wherein the imaging assembly is disposed inside the moving body.

13. The imaging assembly according to claim 1, further comprising an opening and closing member capable of opening and closing at the end portion of the moving body and configured to include the opening portion,
wherein the imaging assembly is disposed in vicinity of the opening and closing member.

14. The imaging assembly according to claim 13, wherein the imaging assembly is configured to include a first image capturing range corresponding to the first region and a second image capturing range corresponding to the second region, and
wherein the first and second image capturing ranges include a movement range of the opening and closing member.

15. The imaging assembly according to claim 14, further comprising a notification circuit configured to notify the presence of an object in the movement range based on an image acquired by the imaging assembly, or a restriction circuit configured to restrict the operation of the opening and closing member when an object is present in the in the movement range.

16. An image acquisition circuit mounted on a moving body, comprising:
an optical system configured to form an image of a subject in a first region near an optical axis and an image of a subject in a second region outside of the first region in which image forming magnification is relatively lower than the first region;
an image capturing element configured to generate image data based on an image of a subject formed on a light receiving surface by the optical system; and
a signal processing circuit configured to process a signal acquired from the image capturing circuit,
wherein the moving body has the image capturing element, and
wherein the center of the light receiving surface of the image capturing element is displaced in a predetermined direction with respect to an optical axis of the optical system so that the image acquisition circuit is capable of capturing an image of a rear end portion of the moving body with the second region and an outside portion of the moving body around a horizontal rear direction of the moving body with the first region, and
wherein the imaging assembly is capable of capturing an image of at least a lower part of a back door portion even in any moving state within a movement range of the back door portion.

17. The image acquisition circuit according to claim 16, wherein the image capturing circuit is disposed at a position where an optical axis of the optical system passes through the opening portion with respect to the moving body.

* * * * *